United States Patent [19]

Argabright et al.

[11] 4,039,485

[45] Aug. 2, 1977

[54] ION EXCHANGE OF METALS FROM AQUEOUS SOLUTIONS USING COMPOSITIONS OF SYNTHETIC RESINS REACTED WITH POLYISOCYANURATE SALTS

[75] Inventors: Perry A. Argabright, Larkspur, Colo.; Larry M. Echelberger, Robinson, Ill.; Brian L. Phillips, Littleton, Colo.

[73] Assignee: Marathon Oil Company, Findlay, Ohio

[21] Appl. No.: 593,397

[22] Filed: July 7, 1975

Related U.S. Application Data

[62] Division of Ser. No. 412,057, Nov. 2, 1973, Pat. No. 3,920,545.

[51] Int. Cl.$^2$ .......................... C08F 18/24; C22B 3/00
[52] U.S. Cl. ............................ 260/2.2 R; 75/101 BE; 260/77.5 NC; 260/77.5 AT; 260/2.1 R
[58] Field of Search .................... 260/2.2 R, 77.5 NC, 260/77.5 AT, 2.1 C; 75/101 BE

[56] References Cited

U.S. PATENT DOCUMENTS

| | | | |
|---|---|---|---|
| 3,211,704 | 10/1965 | Gilman et al. | 260/77.5 |
| 3,539,665 | 11/1970 | Kochbar | 260/895 |
| 3,573,259 | 3/1971 | Argabright | 260/2.1 R |
| 3,840,496 | 10/1974 | Argabright et al. | 260/77.5 NC |
| 3,843,374 | 10/1974 | Kutis et al. | 260/77.5 NC |
| 3,852,100 | 12/1974 | Argabright et al. | 260/77.5 NC |
| 3,852,220 | 12/1974 | Kimmet et al. | 260/77.5 NC |
| 3,920,545 | 11/1975 | Argabright et al. | 260/77.5 NC |

*Primary Examiner*—Joseph L. Schofer
*Assistant Examiner*—Peter F. Kulkosky
*Attorney, Agent, or Firm*—Joseph C. Herring; Jack L. Hummel

[57] ABSTRACT

Metals can be removed from aqueous solutions by contacting such solutions with a composition formed by reacting polyisocyanurate salts with synthetic resins. The resulting composition contains polyisocyanurate salt groups which act as exchange sites for removing the metals from solution. Regeneration by treatment with suitable inorganic metal salts and use of chloromethylated synthetic resins in the forming of the polymer are utilized in preferred embodiments.

10 Claims, No Drawings

ION EXCHANGE OF METALS FROM AQUEOUS SOLUTIONS USING COMPOSITIONS OF SYNTHETIC RESINS REACTED WITH POLYISOCYANURATE SALTS

This is a division of application Ser. No. 412,057 filed Nov. 2, 1973 now U.S. Pat. No. 3,920,545.

BACKGROUND OF THE INVENTION

1. Field of the Invention

The present invention relates to the ion exchange of metal salts from aqueous solutions.

2. Description of the Prior Art

A search indicates the following literature as prior art: Merrifield, R. B., *Advances in Enzymology and Related Area of Molecular Biology*, Vol. 32, 1969. P 221-296 Solid-Phase Peptide Synthethis; Glup, R. L. Clup, G. L., *Advance Wastewater Treatment*, 1971, Chap. 10 pp 207-246, publisher Van Nostrand Reinhold Co.; and Helfferich, F. G., (1962) *Ion Exchange* McGraw Hill, N.Y., 1962.

Though the prior art is thoroughly covered by the above literature and the further literature cited therein, the inventors know of no previous use of isocyanurate salts for removal of metals other than their own U.S. Pat. No. 3,893,916, issued July 8, 1975, which precipitates certain metals.

The present invention provides a selective removal of metals in the presence of other cations, e.g., calcium and magnesium with only minor loss of ion exchange capacity by exchange with other such cations.

SUMMARY

General Statement of the Invention

The present invention prepares compositions of synthetic resins, e.g., chloromethylated polystyrene with polyisocyanurate salts, e.g., those prepared by the techniques of U.S. Pat. No. 3,573,259 "Process for the Preparation of Isocyanurate-Containing Polyisocyanate Salts" to Perry A. Argabright, Brian L. Phillips, and Joe T. Kelly, patented March 30, 1971.

The invention embodies the discovery that polyisocyanurate salts can be readily reacted with conventional synthetic resins and that the resulting composition provides excellent removal of metals with minimum loss of ion exchange reactivity through reaction with calcium, magnesium, and other extraneous cations.

Utility of the Invention

The invention is useful for the removal of metals from a wide variety of aqueous solutions including industrial and commercial effluents, for purification of process streams, thereby preventing precipitation on internal screens or filters; for removal of deleterious metals from ingestible liquids, e.g., drinking water; for removal of metals where they could react with commercial products e.g., as in catalyst production or in hydrocarbon conversion processes.

DESSCRIPTION OF THE PREFERRED EMBODIMENTS

Polyisocyanurate Salts: The isocyanurate compounds for use in preparing the isocyanurate salt-based ion exchange resins of the present invention are water-soluble materials. The most preferred isocyanurate compounds have the structure:

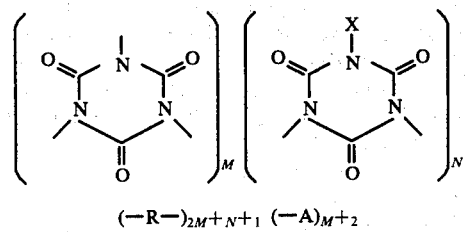

where
R = divalent radical
x = an alkali metal (e.g., Na, K, Li), hydrogen, quaternary ammonium, e.g., mono-, di-, tri-, or tetra-lower alkyl-substituted ammonium or unsubstituted ammonium, or a combination thereof,
A = a monovalent group selected from the following: isocyanate, urethane ($NHCO_2R'$), urea, amino
R' = monvalent radical
M = average number of trisubstituted isocyanurate rings
N = average number of isocyanuric acid and/or isocyanurate salt groups
$2M+N+1$ = average of divalent R groups
$M+2$ = average number of A groups wherein R preferably contains two to 40, more preferably two to 30, and most preferably four to 18 carbon atoms; R' preferably contains one to 40, more preferably one to 20, and most preferably one to 10 carbon atoms, and wherein there ae no N-to-N bonds and no A-to-N bonds, and no A-to-A bonds, and no R-to-R bonds.

These starting materials can be produced by known processes, e.g., those described in the aforementioned U.S. Pat. No. 3,573,259.

Preferably, the polyisocyanurate salts will be present in the reaction mixture in a ratio equivalent to from about 1 to about 50, more preferably from about 2 to about 25, and most preferably from about 3 to about 5 moles of basic isocyanurate salt groups for each mole of reactive anion group in said synthetic resin to be utilized as reactant.

Synthetic Resins: The most preferred synthetic resin for use with the present invention is chloromethylated polystyrene which is ideally suited to the invention, both from a standpoint of solubility and of reactivity. However, the synthetic resins for use with the invention are not narrowly critical and will generally be chosen for reasons of economics and their physical properties with a view toward the intended application of the resulting ion exchange resin product. Other suitable resins include bromomethylated- and iodomethylated- and other haloalkylated polystyrenes, polyepihalohydrins, haloakylated polyphenyl ethers, halogenated polypropylene. In general, "halo" in the above will generally be chloro, bromo, or iodo, or mixtures thereof and "alkyl" will be lower alkyl ($C_1-C_6$). Any halogenated polymer in which a substantial number of the halogens are in a primary position can be used. An important consideration for the synthetic resin is that it be soluble in a suitable medium for reaction with the polyisocyanurate salts.

End Product: The end product of the reaction of the synthetic resin with the water-soluble polyisocyanurate salt, both described above, is a water-insoluble composition containing compounds which include in a single molecule, the isocyanurate salt groups having the structural formula set forth above and also a substantially hydrocarbon skeleton derived from the synthetic resins used as starting materials as described above. The end product resins of the present invention are water-insoluble. The substantially hydrocarbon skeleton will comprise from about 10 to about 90, more preferably from about 25 to about 75, and most preferably from about 40 to about 60 weight percent of such compounds. Where the synthetic resin utilized is a halogenated polystyrene, the end products of the present invention will be characterized by containing the isocyanurate salt group of the structural formula set forth above, together with the following two groups derived from the halomethylated polystyrene starting material:

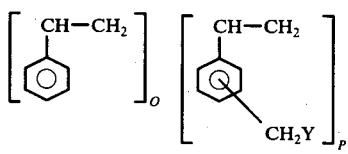

where Y may be Cl, Br, or I.

Aqueous Solutions: The aqueous solutions of the present invention can contain, in addition to the metals which are to be removed, concentrations of other anions and cations. It is a particular feature of the present invention that extraneous cations such as calcium or magnesium do not interfere with the exchange process.

Metals: Metals which can be removed by the present invention include: Al, Ti, V, Cr, Mn, Fe, Co, Ni, Cu, Zn, Ga, Ge, Y, Zr, Cb, Mo, Tc, Ru, Rh, Pd, Ag, Cd, In, Sn, Sb, Ba, La, Hf, Ta, W, Re, Os, Ir, Pt, Au, Hg, Tl, Pb, Bi, Ra, Ac, Th, Pa, and U.

The preferred metals to be removed according to the present invention include Hg, Ba, Pb, Al, Cu, Fe, Cr, Co, Ni, Sb, and Sn. The process of the invention is particularly preferred for the removal of mercury, lead, and barium, and most preferred for the removal of mercury.

Because of the ease of regeneration with sodium chloride, the invention is especially preferred for the removal of mercury from solutions.

EXAMPLE I

Preparation of Polyisocyanurate Salt

A 5.0 liter four-necked glass reactor equipped with a motor driven stirrer, reflux condenser, thermometer and adapter for introducing liquids is charged with 81.5 g of NaOCN (1.25 mole) and 2.5 liters of anhydrous dimethylformamide (DMF). To the resulting slurry at 75° C., is added 190 ml of tolylene diisocyanate (1.34 moles) at a rate of 2.97 ml./min. by means of a motor-driven syringe pump. After the addition is complete the mixture is allowed to react an additional 5 min., 300 ml. of anhydrous methanol added, and the resulting mixture stirred an additional 1.6 hours at 75° C. The resulting polyisocyanurate salt product is entirely soluble in dimethylformamide. Purification consists of filtering to remove any unreacted sodium cyanate and vacuum distillation at reduced pressures to remove dimethylformamide. The sample is extracted in a Soxhlet extractor using acetone in order to remove any residual DMF, methanol, and non-salt products, and vacuum dried at 100° C. to remove trace amounts of acetone. The yield of product is 75.1 weight percent.

The ratio of aromatic rings to end groups:

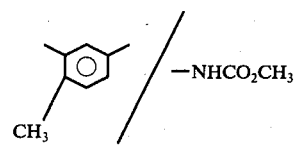

is measured by n.m.r. (in $D_2O$) and found to be 1.74.

EXAMPLE II

Preparation of Chloromethylated Polystyrene

Polystyrene (25 g of a commercial product provided by Dow Chemical Company having a molecular weight of about 25,000) is dissolved in dichloroethane and the solution cooled to 0° C. A solution of chloromethyl-methyl ether (50 ml, 0.63 mole) and $SnCl_4$ (7.5 ml, 0.06 mole) in dichloroethane is added dropwise over 30 minutes with stirring, maintaining the reaction temperature at about 5° C. After stirring an additional 30 minutes at 5° C., $H_2O$ (35 ml) is added and the reaction mixture is allowed to stand overnight. The ethylene dichloride is removed by distillation at reduced pressure and the resulting mixture is washed with water and dried in vacuo at about 80° C. The resulting product contains 13.9% chlorine by wt.

EXAMPLE III

Preparation of the Ion Exchange Composition

The chloromethylated polystyrene prepared in Example II (3 grams) is dissolved in DMF (10 ml, commercial grade, dried). The polyisocyanurate salt of Example I (13 grams) is dissolved in DMF (50 ml) and the solution is filtered (medium sintered glass). The two above solutions are then mixed under a nitrogen atmosphere and stirred at 75° C. for four hours. After cooling in an ice bath, the DMF is stripped in vacuo and the residue is washed with water to remove impurities. Drying at 80° C. in vacuo, yields a powder, 7.2 grams. The infrared spectrum and elemental analysis confirm the presence of isocyanurate salt groups and polystyrene.

EXAMPLE IV

Removal of Mercury-from aqueous solution by ion exchange

The product of the preceding example is packed into 0.5 centimeter diameter biuret. An aqueous solution of mercuric perchlorate (initial concentration 25 parts per million $Hg^{++}$) is passed through the column at approximately one ml per minute. After eluting 10 ml the concentration of $Hg^{++}$ in the effluent is only 0.11 part per million, demonstrating the efficacy of the ion exchange process of the invention.

EXAMPLE V

Regeneration of the ion exchange resin of the invention

The polymer used in Example IV is washed by passing distilled water through the column at a rate of 0.5 ml per minute. After eluting 50 ml the effluent contains 8 ppm $Hg^{++}$. The polymer is then eluted with 1 molar aqueous sodium chloride at a rate of 0.5 ml per minute. The effluent contains 78 ppm $Hg^{++}$ after the first 50 ml of sodium chloride solution is passed over the column, demonstrating the efficacy of sodium chloride solutions in regenerating the polymer.

Modification of the Invention

It should be understood that the invention is capable of a variety of modifications and variations which will be apparent to those skilled in the art by a reading of the specification and which are to be included within the spirit of the claims appended hereto.

For example, packed columns, substrate welded to paddles, and other forms of ion exchange contacting apparatus can be utilized with the invention.

In addition, the compositions of the present invention can be alternatively made by reacting the isocyanurate salts described above with monomers of e.g., haloalkyl styrenes and subsequently polymerizing to form long-chain polymers containing both the isocyanurate salt groupings and the substantially hydrocarbon skeleto. While not preferred, such techniques do provide an alternate route to at least some of the molecules utilized as ion exchange resins by the present invention.

What is claimed is:

1. A water-insoluble product by process obtained by reacting about 1 to about 50 moles of a polyisocyanurate salt having the structure:

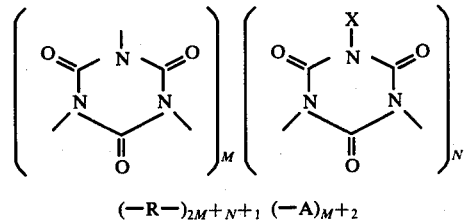

wherein
- R = divalent radial
- X = an alkali metal, alkaline earth metal, or hydrogen, quaternary ammonium mono-, di-, tri-, or tetra-lower alkyl-substituted ammonium and unsubstituted ammonium, or a combination thereof,
- A = a monovalent group selected from the following: isocyanate, urethane ($NHCO_2R'$), urea, amino
- R' = monovalent radical
- M = average number of trisubstituted isocyanurate rings
- N = average number of isocyanuric acid and/or isocyanurate salt groups
- 2M+N+1 = average of divalent R groups
- M+2 = average number of A groups with at least one halogen equivalent on a synthetic resin selected from the group consisting of haloalkylated polystyrene, polyepihalohydrin, haloalkylated polyphenyl ether, and halogenated polypropylene.

2. A composition comprised of the product of claim 1 wherein group A is an isocyanate group.

3. A composition comprised of the product of claim 1 wherein group A is a urethane group.

4. A composition comprised of the product of claim 1 wherein group A is a urea group.

5. A composition comprised of the product of claim 1 wherein group A is an amino group.

6. A composition comprised of the product of claim 1 wherein Group R contains 2-40 carbon atoms, and wherein Group R contains 1-40 carbon atoms.

7. A composition comprised of the product of claim 1 wherein the polyisocyanurate salt is present in the reaction mixture in a ratio equivalent to about 2 to about 25 moles of polyisocyanurate salt for each halogen equivalent in said synthetic resin.

8. A composition comprised of the product of claim 1 wherein the resin has the structure:

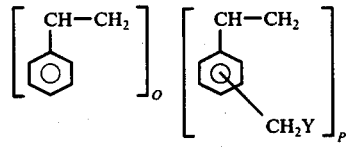

wherein
- O = average number of non-alkylated aryl groups in the haloalkylated polystyrene resin,
- P = average number of haloalkylated aryl groups in the haloalkylated polystyrene resin,
- Y = Cl, Br, and I.

9. A composition comprised of the product of claim 8 wherein Y is a bromo group.

10. A composition comprised of the product of claim 8 wherein Y is an iodo group.

* * * * *